United States Patent [19]
Allen et al.

[11] Patent Number: 5,025,121
[45] Date of Patent: Jun. 18, 1991

[54] CIRCUIT BREAKER CONTACT ASSEMBLY

[75] Inventors: Frankie H. Allen, Acworth; David A. Leone, Lawrenceville, both of Ga.

[73] Assignee: Siemens Energy & Automation, Inc., Alpharetta, Ga.

[21] Appl. No.: 286,544

[22] Filed: Dec. 19, 1988

[51] Int. Cl.$^5$ .............................................. H01H 1/06
[52] U.S. Cl. ..................................... 200/275; 200/254
[58] Field of Search ............... 200/275, 279, 254, 255, 200/256, 258, 259, 260, 261, 238, 291, 554, 253.1, 257

[56] References Cited

U.S. PATENT DOCUMENTS

| | | | |
|---|---|---|---|
| 2,751,471 | 6/1956 | Wills | 200/254 |
| 3,641,300 | 2/1972 | Nitz | 200/254 |
| 3,867,602 | 2/1975 | Jawelak | 200/282 |
| 3,890,258 | 6/1975 | Miller | 200/150 R |
| 4,218,596 | 8/1980 | Clausing | 200/144 R |

FOREIGN PATENT DOCUMENTS

| | | |
|---|---|---|
| 1222137 | 2/1967 | Fed. Rep. of Germany . |
| 3332141 | 3/1985 | Fed. Rep. of Germany . |
| 2296252 | 7/1976 | France . |
| 68278 | 3/1925 | Sweden ............................ 200/260 |

OTHER PUBLICATIONS

European Search Report.

Primary Examiner—Henry J. Recla
Assistant Examiner—Glenn T. Barrett
Attorney, Agent, or Firm—Peter A. Luccarelli, Jr.; James G. Morrow

[57] ABSTRACT

A primary disconnect assembly for a circuit breaker. The assembly includes a plurality of contact fingers for engaging the terminals of a bus bar assembly. The terminals and fingers are configured such that the terminals each include depressions adapted to accept the contact portions of the contact fingers. This configuration provides at least two contact locations between each contact finger and terminal. Additionally, this configuration increases the force required to slide the fingers relative to the terminals.

6 Claims, 3 Drawing Sheets

CIRCUIT BREAKER CONTACT ASSEMBLY

BACKGROUND OF INVENTION

This invention relates to a contact assembly for a circuit breaker. More particularly, this invention relates to the primary disconnect assemblies which electrically couple a circuit breaker to a bus bar assembly.

Normally, industrial circuit breakers are coupled to the circuit they are protecting by primary disconnect assemblies. FIGS. 5, 6, 7, and 9 of U.S. Pat. No. 4,218,596 illustrate the general type of primary disconnect assemblies with which the present invention is concerned. The figures of U.S. Pat. No. 3,641,300 also illustrate this type of primary disconnect assembly. Referring to FIG. 2 of U.S. Pat. No. 3,641,300, this figure illustrates a primary disconnect assembly which is mounted on an electrically conductive circuit breaker stud and which is shown in engagement with an electrically conductive bus bar stud (terminal).

A disadvantage of the primary disconnect assemblies of U.S. Pat. Nos. 4,218,596 and 3,641,300 is that they provide only one current carrying contact location between each contact finger and its associated bus bar terminal. Additionally, this arrangement provides little restraining force to resist the separation of the primary disconnects or their movement relative to the circuit bus bars during short circuit conditions. In the prior art, friction between the contact fingers and the bus bar terminals is the only force present to prevent the fingers from moving relative to the terminals. In some situations friction is not enough to prevent the fingers from moving relative to the terminals. For example, under certain load conditions when a circuit breaker interrupts a current flow, the circuit breaker can subject the fingers to forces which tend to slide the fingers along the terminals.

SUMMARY OF THE INVENTION

An object of the present invention is to provide a disconnect assembly which restricts movement of circuit breaker contact fingers relative to their associated terminals when the contact finger/terminal assembly is subjected to short circuit forces acting on the circuit breaker.

Accordingly, there is provided a primary disconnect assembly for a circuit breaker which includes a terminal member, at least two contact fingers, means for holding the contact fingers in engagement with the terminal member, and means for coupling the contact fingers to the circuit breaker. The terminal member defines a first side and a second side, wherein each side includes a depression, and the contact fingers each define a contact portion. The contact portions are adapted to engage the depressions of the terminal member such that at least one contact location is present between each contact portion and the terminal member.

An advantage of the present invention is that the disconnect assembly can provide more than one contact location between each contact finger and its associated terminal. Another advantage of the present invention is that it provides a primary disconnect assembly with an improved current carrying capacity.

Various other objects and advantages of the present invention will become apparent from the following description, with reference to the accompanying drawings.

DETAILED DESCRIPTION OF THE PREFERRED EMBODIMENT

Figure 1:
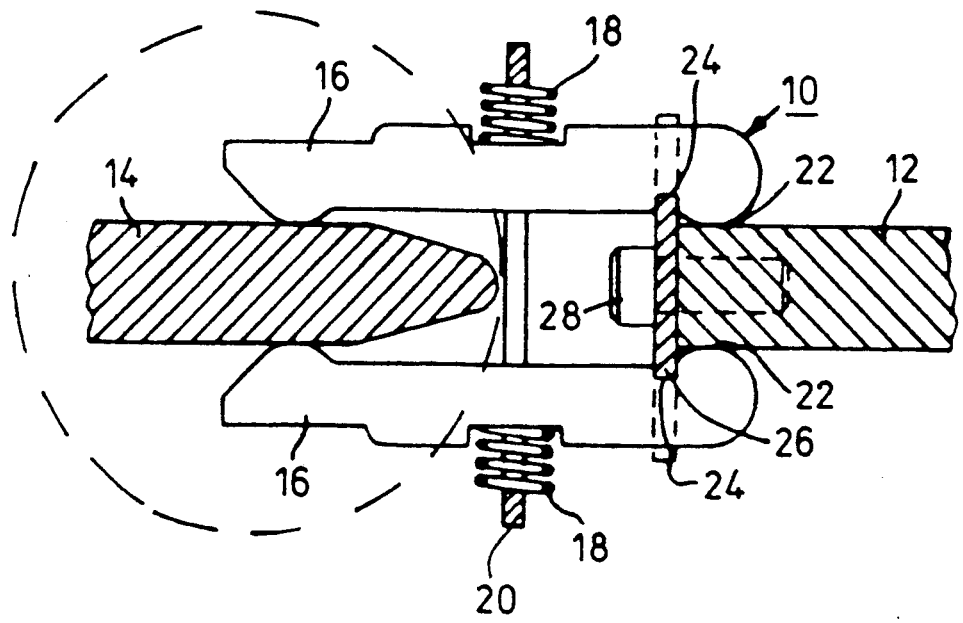
FIG. 1 is a top view of a primary disconnect assembly.
Figure 2:
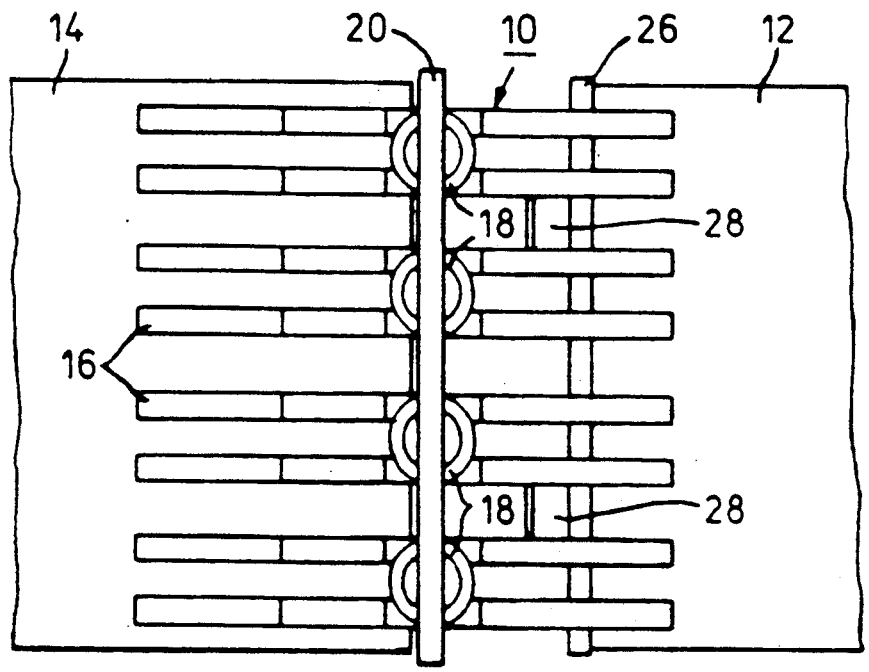
FIG. 2 is a side view of FIG. 1.

Referring now to FIGS. 1 and 2, these figures illustrate an embodiment of a primary disconnect assembly 10 for a circuit breaker. This assembly includes eight pairs of contact fingers 16, a bus bar terminal 14, eight compression springs 18 and a spring frame 20 for maintaining the springs 18 in compression against the fingers 16. The fingers 16 are coupled to the terminal 12 of a circuit break via the contact locations 22, and the fingers 16 include slots 24 for engaging a rail 26 of the terminal 12. The rail 26 is fixed to the terminal 12 with bolts 28.

Figure 3:
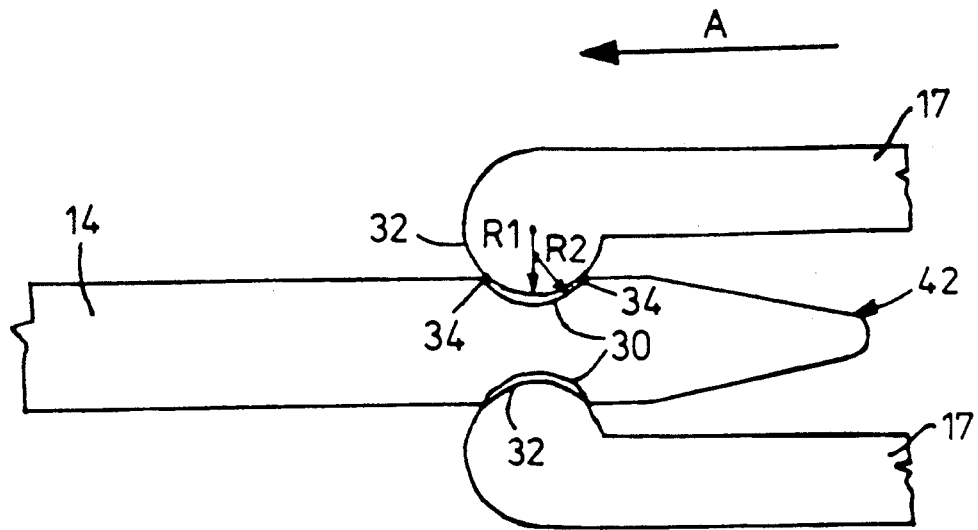
FIG. 3 is a first modification of the portion of the assembly resting within the dashed circle of FIG. 1.
Figure 4:
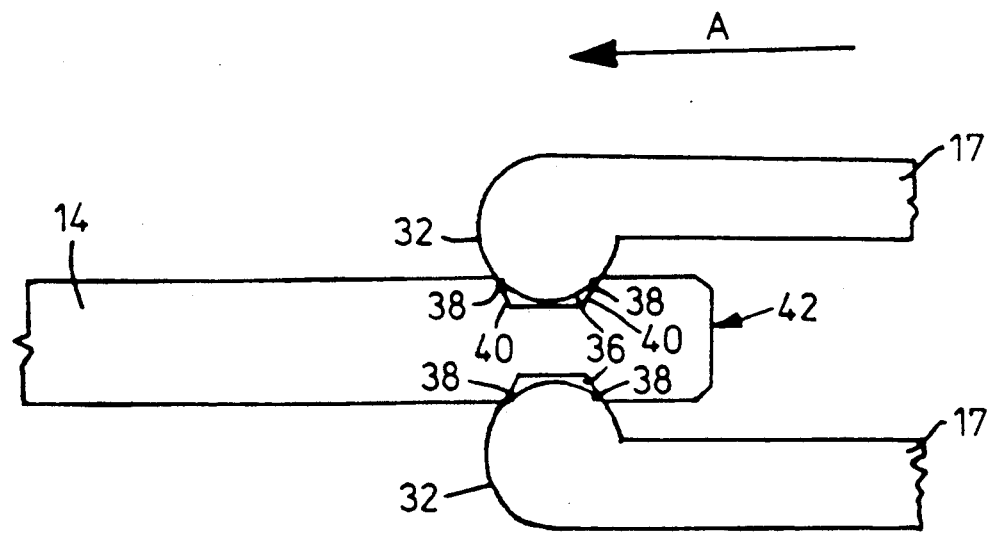
FIG. 4 is a second modification of the portion of the assembly resting within the dashed circle of FIG. 1.
Figure 5:
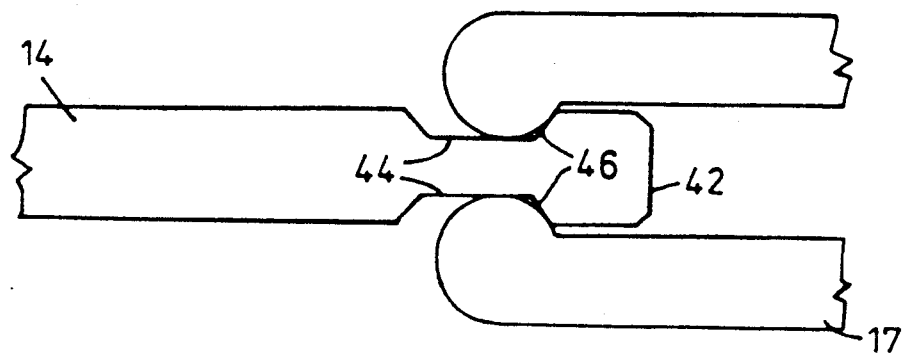
FIG. 5 is a third modification of the portion of the assembly resting within the dashed circle of FIG. 1.

FIGS. 3, 4 and 5 illustrate three embodiments of the improvement to the disconnect assembly. The portion of the assembly 10 with which the embodiments are generally concerned, is located within the dashed circle of FIG. 1. In the first embodiment, the terminal 14 is configured to include depressions 30 which have a circular or arcuate contact surface of radius R2. The contact fingers 17 also include a circular or arcuate contact surfaces 32 of radius R1. The radius R1 is larger that the radius R2 to provide two contact locations 34 between each finger 17 and the terminal 14.

In the second embodiment, the terminal 14 is configured to include depressions 36 which each have obelisk shaped contact surfaces. When the fingers 17 engage the depressions 36, a contact location 38 is provided along each surface 40. As with the first embodiment, the increased number of contact locations 34, 38 allow for an increased current carrying capacity for a given size disconnect assembly.

In the third embodiment, the terminal 14 includes obelisk shaped depressions similar to the second embodiment but configured to provide one contact location on the flat portion 44 and one contact location on the inclined surface 46.

In each embodiment, the terminals 14 can be provided with an end 42 such as those illustrated in FIGS. 3, 4 and 5. This type of end allows the fingers 17 to slide in the direction A onto the terminals 14 with decreased force. In addition to providing two contact locations between each finger 17 and its associated terminal 14, the depressions 30, 36 provide a relatively positive engagement between the fingers 17 and the associated terminal 14. This engagement, assists in preventing the fingers 16 from moving relative to the associated terminal 14 when the circuit breaker connected to the fingers 17 transmits a force to the fingers 16. The depression of FIGS. 3, 4 and 5, can be configured as in FIG. 6 to extend along only a portion of the terminal 14. In this embodiment of the depression, the ends 48 of the depression serve to provide a means for preventing the fingers 17 from moving off of the terminal 14 during short circuit conditions.

The engagement of the fingers 17 and the associated terminal 14 is also designed so that the fingers 17 can be disengaged from the terminal 14 for purposes of disconnecting a circuit breaker from the circuit or bus bar assembly coupled to the terminal 14.

Figure 6:
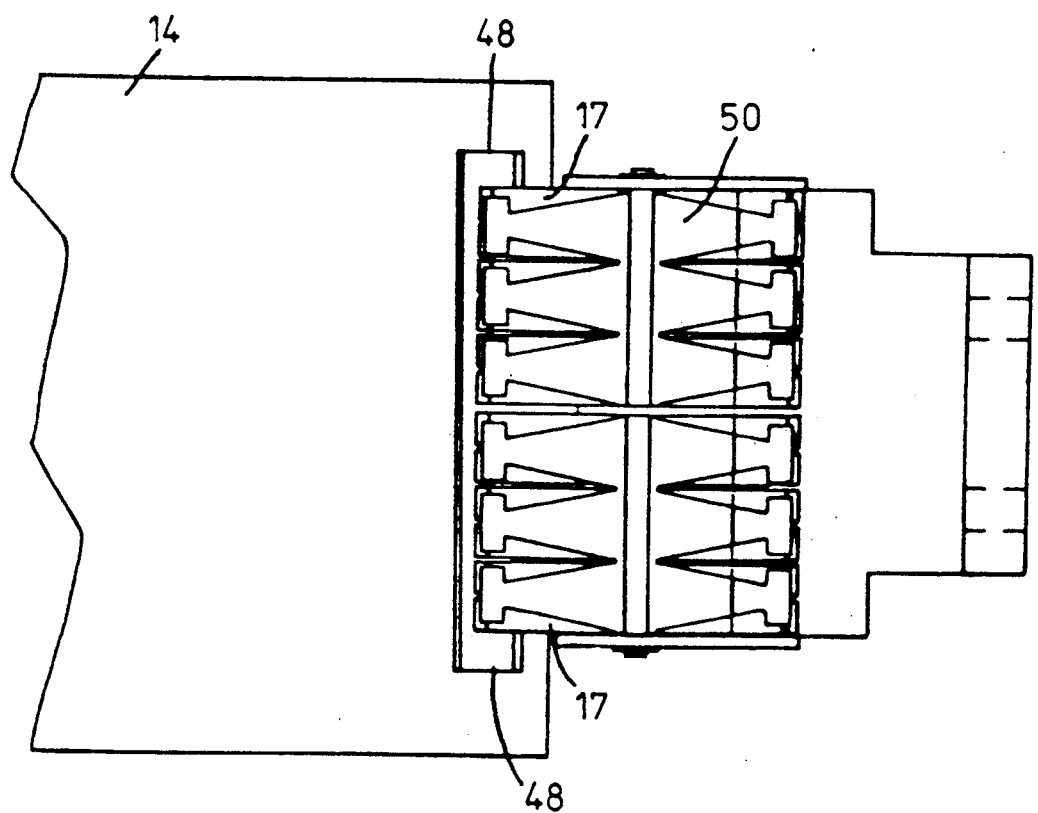
FIG. 6 is a side view of FIGS. 3, 4, and 5.

While three embodiments of a disconnect assembly have been shown and described in detail herein, various other changes and modifications may be made without departing from the scope of the present invention. For example, the shape of the depressions 30, 36 and the contact surfaces 32 could be varied while still having the ability to provide two contact locations between the fingers 17 and the terminals 14. Additionally, a leaf spring assembly 50 as illustrated in FIG. 6 could be used to replace the springs 18.

We claim:

1. A primary disconnect assembly for a circuit breaker comprising:
    a terminal member defining a first side including a first depression and a second side including a second depression, wherein each depression opens away from the terminal member and each depression includes an arcuate contact surface having a first radius;
    at least two contact fingers each defining a contact portion having an arcuate contact surface having a second radius, wherein the second radii are greater than the first radii and the contact portions are adapted to engage the depressions of the terminal member such that at least two contact locations are present between each contact portion and the terminal member, and the terminal member is situated between the contact portions;
    means for holding the contact portions in engagement with the depressions of the terminal member, the contact portions being disposed within the depressions when the assembly is in a normal operating position; and
    means for coupling the contact fingers to the circuit breaker.

2. The assembly of claim 1 wherein the means for holding the contact portions in engagement comprises:
    at least two spring means; and
    a spring frame, wherein the spring means are compressed between the spring frame and the contact fingers.

3. A primary disconnect assembly for a circuit breaker comprising:
    a terminal member defining a first side including a first depression and a second side including a second depression, wherein each depression opens away from the terminal member and each depression includes a generally circular shaped surface with a first radius;
    at least two contact fingers each defining a contact portion, wherein each contact portion includes a substantially circular shaped contact surface having a second radius which is larger than the first radius, the contact portions being adapted to engage the depressions of the terminal member such that at least two contact locations are present between each contact portion and the terminal member, the terminal member being situated between the contact portions;
    means for holding the contact portions in engagement with the depressions of the terminal member, the contact portions being disposed within the depressions when the assembly is in a normal operating position; and
    means for coupling the contact fingers to the circuit breaker.

4. The assembly of claim 3 wherein the means for holding the contact portions in engagement comprises:
    at least two spring means; and
    a spring frame, wherein the spring means are compressed between the spring frame and the contact fingers.

5. A primary disconnect assembly for a circuit breaker comprising:
    a terminal member defining a first side including a first depression and a second side including a second depression, wherein each depression opens away from the terminal member and each depression includes a first substantially flat surface and a second substantially flat surface;
    at least two contact fingers each defining a contact portion, wherein each contact portion includes a substantially semi-circular contact surface, the contact portions being adapted to engage the depressions of the terminal member such that at least two contact locations are present between each contact portion and the terminal member, and the terminal member is situated between the contact portions;
    means for holding the contact portions in engagement with the depressions of the terminal member, the contact portions being disposed within the depressions when the assembly is in a normal operating position; and
    means for coupling the contact fingers to the circuit breaker.

6. The assembly of claim 5 wherein the means for holding the contact portions in engagement comprises:
    at least two spring means; and
    a spring frame, wherein the spring means are compressed between the spring frame and the contact fingers.

* * * * *